United States Patent [19]

Kaetzel

[11] 4,189,902
[45] Feb. 26, 1980

[54] MOWER-CONDITIONER

[75] Inventor: Pierre Kaetzel, Saverne, France

[73] Assignee: Samibem, S.A., Marmoutier, France

[21] Appl. No.: 874,641

[22] Filed: Feb. 2, 1978

[30] Foreign Application Priority Data

Sep. 8, 1977 [FR] France ................................ 77 27955

[51] Int. Cl.² .......................................... A01D 35/264
[52] U.S. Cl. ......................................... 56/15.6; 56/1; 56/DIG. 1
[58] Field of Search ................. 56/1, DIG. 1, 6, 14.9, 56/15.6, 12.7, 16.2, 192, 227, 218, 17.3, 15.9,

[56] References Cited

U.S. PATENT DOCUMENTS

| | | | |
|---|---|---|---|
| 2,906,076 | 9/1959 | McCarty et al. | 56/DIG. 1 |
| 2,977,737 | 4/1961 | Newcomer | 56/DIG. 1 |
| 3,142,144 | 7/1964 | Ronning | 56/228 |
| 3,457,709 | 7/1969 | Killbery et al. | 56/228 |
| 3,469,378 | 9/1969 | Hebsters et al. | 56/11.9 |
| 3,673,779 | 7/1972 | Scarnato et al. | 56/DIG. 1 |
| 3,699,755 | 10/1972 | Hauser | 56/DIG. 1 |
| 3,729,907 | 5/1973 | Burrough et al. | 56/DIG. 1 |
| 3,233,796 | 5/1973 | Wood et al. | 56/DIG. 1 |
| 3,972,159 | 2/1976 | Oosterling et al. | 56/16.2 |
| 4,063,748 | 12/1977 | Schmidt | 56/6 |
| 4,077,192 | 3/1978 | Klinner et al. | 56/DIG. 1 |

FOREIGN PATENT DOCUMENTS 1309822  3/1973  United Kingdom ..................... 56/15.9

Primary Examiner—Russell R. Kinsey
Assistant Examiner—Paul J. Hirsch
Attorney, Agent, or Firm—Young & Thompson

[57] ABSTRACT

The disclosure is of a mower-conditioner comprising a cutting mechanism and a conditioning mechanism, the said machine being hitched laterally beside a tractor, preferably beside one of its rear wheels, and comprising at the same time a post connected on the one hand to a double-output control box fixed to the said wall and on the other to the bearing of an input pulley and a tube permitting the machine to oscillate about an axis oriented substantially according to the direction of travel of the machine, the said tube constituting its device for hitching in the working position, and the afore-mentioned post extending parallel with the wall of the conditioning passage nearer to the tractor.

5 Claims, 3 Drawing Figures

MOWER-CONDITIONER

INTRODUCTION AND BACKGROUND OF THE INVENTION

The present invention relates to an improvement in mowerconditioners.

Most of these machines are drawn behind a tractor, or semimounted in a rear lateral position in relation to the tractor. These machines are therefore not easy to handle, bulky and difficult to drive in the working position. Moreover they are difficult to use in the transport position, either by reason of their bulk and weight or by reason of their non-functional adaptation to the tractor.

In order to remedy these drawbacks it has been proposed that a mower-conditioner, in the working position, may be disposed no longer behind a tractor necessary for its operation, but laterally beside the said tractor.

A mower-conditioner thus hitched to a tractor is easy to handle by reason of the fact that in turning the momentary centres of rotation of the wheels of the tractor and of the machine are substantially coincident. Thus there is no risk of running over already cut fodder or of crushing the still standing fodder.

Moreover, in order further to increase the compactness and the output of such a mower-conditioner, it is proposed to equip it with a cutting mechanism of working width (L) greater than the conditioning width (l) separating the two walls of the conditioning passage of the machine.

The purpose of the present invention is to simplify the drive, that is to say both the device for coupling in the working position and the device for rotating drive of the cutting mechanism and the conditioning mechanism of a mower-conditioner of the type as described above, without thereby increasing its overall width.

BRIEF SUMMARY OF THE INVENTION

The stated purpose is achieved by disposing the said coupling and drive devices along the lateral wall of the conditioning passage, these devices co-operating with a member such as a post intended to avoid deformations of the said wall. According to the invention it is proposed that parallel with the wall of the conditioning passage nearer to the tractor there extend at the same time a post connected on the one hand to a double-output control box fixed to the said wall and on the other to the bearing of an input pulley, and a tube permitting the machine to oscillate about an axis oriented approximately according to the direction of travel of the machine, the said tube constituting its device for hitching in the working position.

FURTHER DESCRIPTION AND ADVANTAGES OF THE INVENTION

The advantage of such a construction resides in the fact that the afore-mentioned post avoids deformation of the wall of the conditioning passage and permits the bearings of the conditioning rotor to remain correctly aligned, on the one hand when the belts passing over the pulley of the control box and over the input pulley are tensioned, and on the other during driving of the machine in the working position in which its change of direction is determined by the modification of the orientation of a male element which is fast with the tractor and engages in the tube constituting the hitch device of the machine. This male element, the orientation of which is modified when the tractor is turning, exerts a lateral force upon the said tube for the purpose of causing the machine to follow a path parallel with that of the tractor. It is necessary that this tube and the element upon which it is fixed should not be deformed, in order not to disturb the operation of the machine.

According to another characteristic of the present invention the post and the tube are situated outside the conditioning passage but on the near side of the trajectory of the cutting elements of the cutting mechanism, in the region where the said trajectory is closest to the tractor.

According to this characteristic, the overall width of the machine is equal to the width (L) of its cutting mechanism, which contributes effectively to the compactness of the machine, to ease of driving in working and to optimum output.

Thus the above-stated characteristics permit of designing a mower-conditioner of solid but light construction which, for a given working width, is substantially less costly than the mower-conditioners existing on the market.

The invention will be explained in greater detail, with further characteristics and advantages, hereinafter by means of a non-limitative example of embodiment described with reference to the accompanying drawings.

BRIEF DESCRIPTION OF THE VIEWS IN THE DRAWINGS

DETAILED DESCRIPTION OF THE PREFERRED EMBODIMENTS

Figure 1:
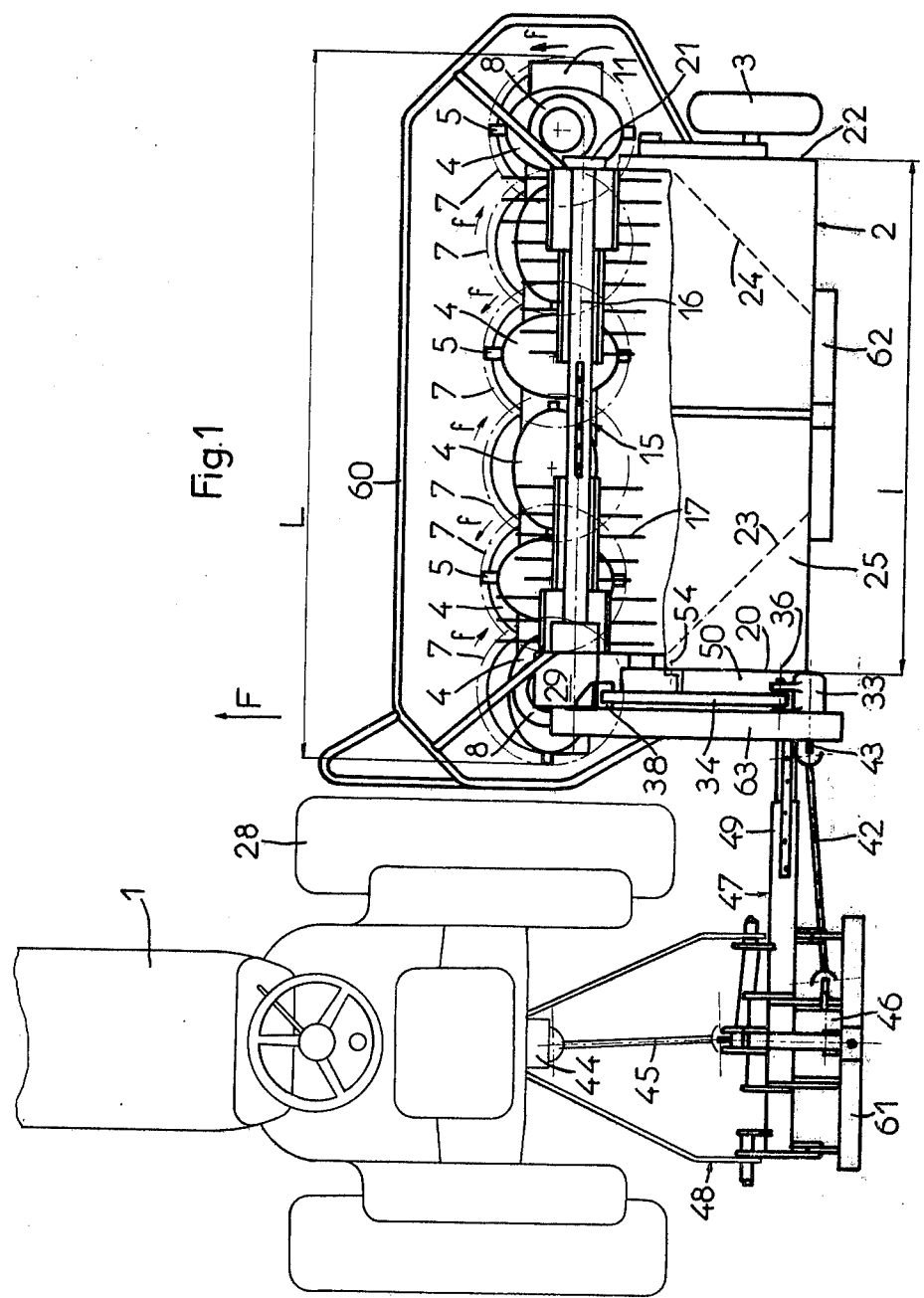
FIG. 1 represents a plan view of a mower-conditioner in the working position.

As represented in FIG. 1 the agricultural machine hitched in the working position to the tractor 1 is of the mower-conditioner type. This machine comprises a chassis 2 supported by wheels 3 provided on each side of the said chassis 2.

The cutting mechanism of the mower-conditioner comprises supports for cutting elements in the form of discs 4 which extend all in one and the same plane, as close to the ground as possible, perpendicularly to the direction F of travel of the mower-conditioner. These discs 4, which are of oval form, are provided with cutting elements such as blades 5. These blades 5, articulated at 6 to the discs 4, place themselves in position radially under the action of centrifugal force on rotation of the discs 4 as indicated by the directions of the arrows f, and describe circular trajectories 7. The end discs 4 are surmounted by a frusto-conical element 8 intended especially cleanly to separate the cut fodder from that still standing and to facilitate its conveying towards the rear by means of members such as ribs 9 and horns 10 fixed on the said element 8. The rotating drive of the discs 4 is effected by means of transmission members (not shown) such as a train of pinions for example, located in an oil tight elongated housing 11 extending beneath the discs 4 and articulated at 12 to the chassis of the machine, being connected to the said chassis 2 by means of brackets 13. The housing 11 is held in a fixed position in relation to the chassis 2 by means of screws 14.

From FIG. 1 it may be noted that the trajectories 7 of the blades 5 of the discs 4 partially overlap. These trajectories 7 are situated one beside the other and aligned perpendicularly of the direction F of travel of the machine and the tractor 1. Thus the forward part of these trajectories 7 determines the cutting front of the machine the width L of which corresponds to the overall width of the machine.

The present invention is not limited to the disc-type cutting mechanism as described above. Other types of cutting mechanism can in fact be perfectly suitable for mower-conditioner according to the invention.

The conditioning mechanism of the machine is constituted by a rotor 15 driven in rotation about a horizontal axis 16 situated above the discs 4 and slightly behind the line on which the vertical axes of rotation of the said discs 4 are situated.

This rotor 15 is here of the type comprising flails 17. These flails 17 pick up the fodder cut by the blades 5 of the discs 4 for the purpose of passing it between the teeth of a fixed comb (not shown). This comb is regulable so that the degree of conditioning of the fodder can be varied.

Figure 3:
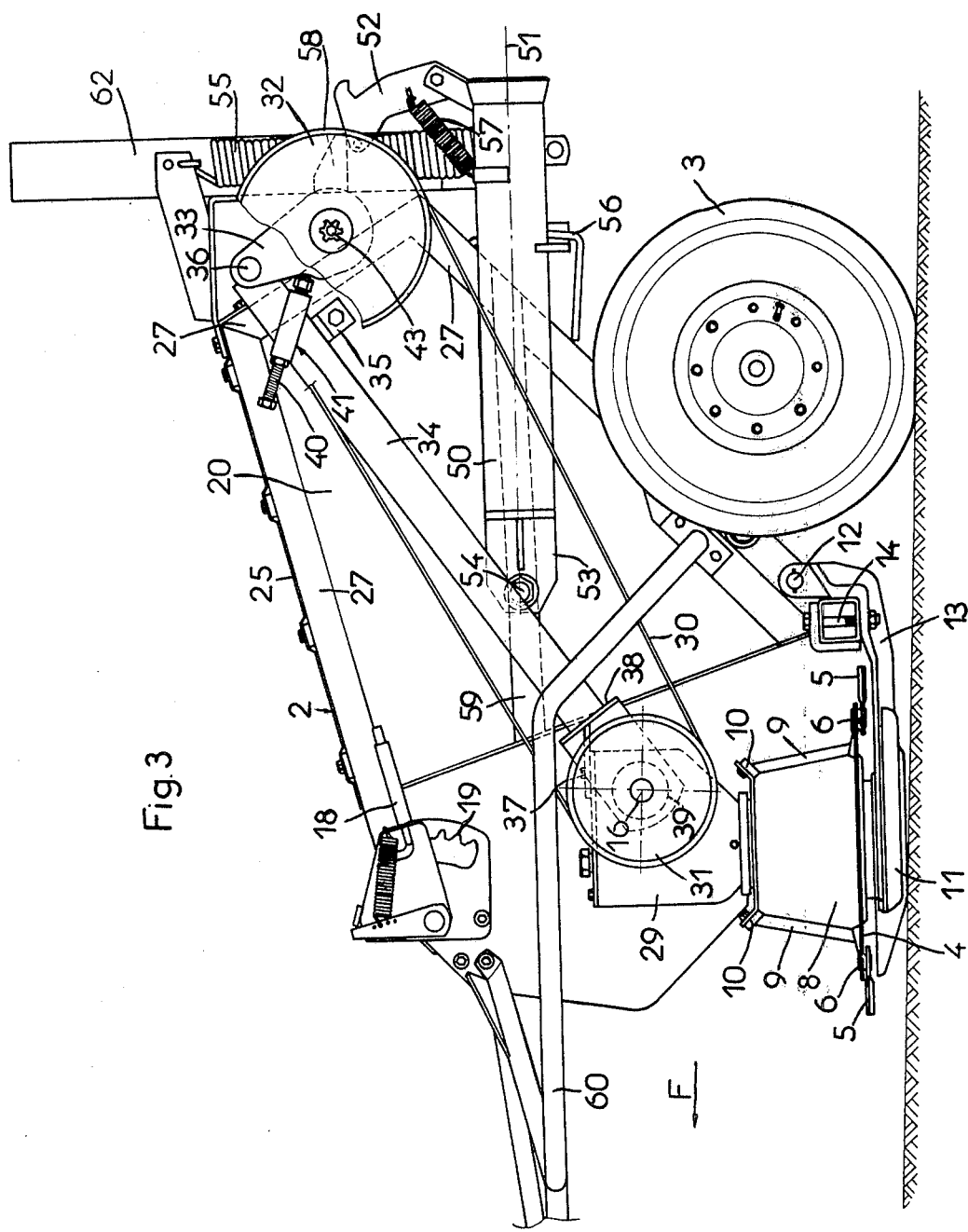
FIG. 3 represents a front view of the wall of the mower-conditioner according to FIG. 1, this wall being provided with the elements for the drive of the machine.

In fact the control handle 18 of the comb may be seen in FIG. 3. This handle 18 can be set into different positions and immobilized in these positions by virtue of notches 19 which correspond to the different degrees of conditioning of the fodder which it is possible to obtain with the machine according to the invention.

The present invention is not however limited to the x above-stated type of conditioning. The conditioning can be obtained very well with the aid of profiled rubber and/or metal rollers for example.

The rotor 15 with beaters 17 as represented in FIG. 1 is mounted on a horizontal shaft perpendicular to the direction F of travel of the machine. Each extremity of the shaft of the rotor 15 is guided respectively on the one hand in a bearing (not shown) provided on the left lateral wall 20 of the conditioning passage and on the other in a bearing 21 provided on the right lateral wall 22 of the conditioning passage.

The bearing 21 is advantageously fixed on the outer face of the wall 22. The conditioning passage in which the rotor 15 is lodged thus comprises a minimum of sharp parts to which fodder debris might attach itself, in passing through the said passage.

Two windrowing plates 23 and 24 are provided at the end of the conditioning passage, which is upwardly closed by a hood 25. The windrowing plates 23 and 24, the position of which is adjustable by means of a lever 26, permit of monitoring the size of the windrow which the conditioned fodder will form in being deposited on the ground behind the machine.

The two lateral walls 20 and 22, bordered on the major part of their periphery by an assembly of U-irons 27 welded to the said walls, are situated at a distance l from one another. This distance, which corresponds to the width l of the conditioning passage, is substantially less than the width of the cutting front L. The conditioning passage is centred substantially in the middle of the cutting front of width L. Therefore if the machine is considered in its direction F of travel, there exist two free zones situated respectively one each side of the lateral walls 20 and 22. These zones are respectively preceded or forwardly bordered by at least a part of the discs 4 situated at the extremities of the cutting front of the mower-conditioner. According to the invention these zones are utilized for the installation of the wheels 3 carrying the machine and for the installation of the transmission and coupling members fast with the machine, provided that the said members are situated outside the conditioning passage and on the near side of the trajectory 7 of the cutting elements 5 of the cutting mechanism, in the region where the said trajectory 7 is closest to the tractor 1.

The driving of the end disc 4, surmounted by its frusto-conical element 8 and situated closest to the right rear wheel 28 of the tractor 1, is effected by means of a control box 29 fixed on the outer face of the lateral wall 20 of the conditioning passage. This control box 29 comprises two outputs. One of these is coaxial with the said end disc 4 and drives the latter directly in rotation. The rotation of this end disc 4 causes the rotation of the other discs 4 by means of the transmission members located in the housing 11. The other output of the control box 29 is coaxial with the shaft 16 of the conditioning rotor 15 and permits of driving the latter in rotation.

The mechanism of the control box 29 is actuated by a set of pulleys over which there pass belts 30 protected by a casing 63 (FIG. 1). The pulley 31 of the control box 29 is keyed on a shaft the axis of which is the same as that of the conditioning rotor 15. Thus the said pulley 31 directly drives the conditioning rotor 15. The shaft on which the pulley 31 is keyed co-operates with the mechanism of the control box 29 by means of gear trains with the purpose of actuating the end disc 4 situated closest to the rear wheel 28 of the tractor 1.

The said belts 30 pass over a second pulley or input pulley 32. This latter pulley 32 is mounted on a regulable bearing carrier 33. This bearing carrier can in fact be moved away from or toward the axis of the pulley 31, in order to tension the belts 30.

As the tension of these belts 30 is quite great and the pulleys 31 and 32 are relatively remote from the left lateral wall 20 of the conditioning passage, there is risk of deformation of the latter by reason of the long lever arm constituted by the axis of the pulleys 31 and 32. In fact these latter are relatively remote from the lateral wall 20 of the conditioning passage.

Figure 2:
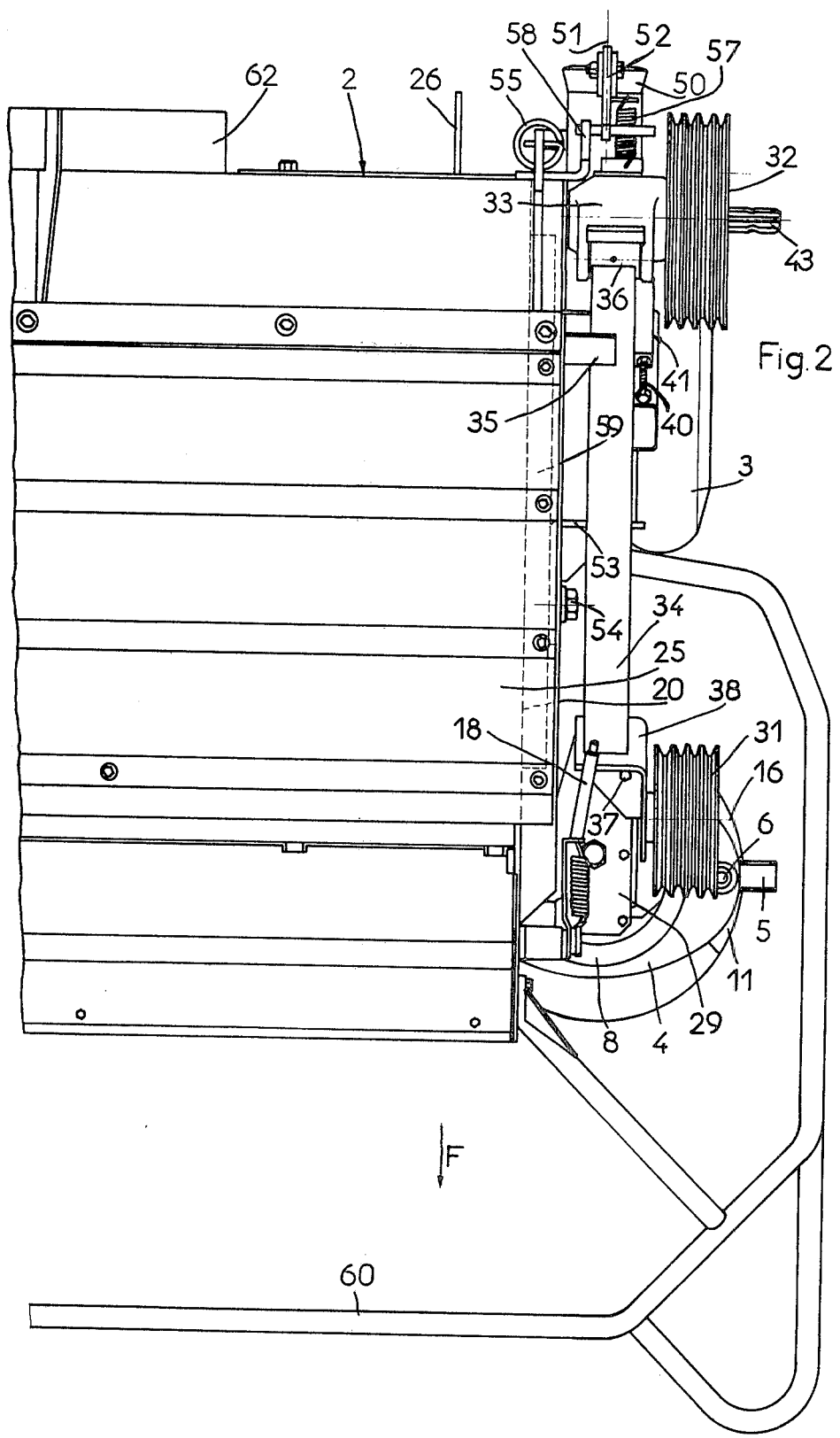
FIG. 2 represents a detail of FIG. 1, on a larger scale.

Consequently a stiffening arm or post 34 is provided, connected to the wall 20 of the conditioning passage by means of at least one bracket 35 and extending parallel with the latter. This post 34 is disposed between the control box 29 and the spindle 36 of the bearing carrier 33. The bearing of the input pulley 32 is thus articulated to one of the ends of the post 34, while its other end is connected rigidly to the double-output control box 29 by means of a screw 37 and an L-shaped bracket 38 (FIG. 2). In one of the arms of this bracket there is provided a bore 39 fitted on the bearing of the pulley 31.

By virtue of the post 34 it is possible to adjust the position of the screw 40 of the regulating device 41 fast with the post 34, to tension the belts 30, without deforming the left lateral wall 20 of the machine. Thus the bearings of the conditioning rotor 15 remain perfectly aligned.

The input pulley 32 is driven in rotation by a telescopic shaft 42 possessing Cardan joints at its extremities. One of these joints is mounted on the splined shaft stub 43 of the input pulley 32 in order to communicate thereto its rotating movement from the power take-off 44 of the tractor 1 and through the intermediary of a shaft 45 similar to the shaft 42. A gear box 46 fixed on the hitch device 47 connects the two shafts 42 and 45.

The hitch device 47 permits the tractor 1 to shift the machine in the working position into a position such that the cutting front L of its discs 4 extends substantially perpendicularly to the plane of the right rear wheel 28 of the tractor 1 and substantially at the level of the said wheel.

The said hitch device 47 connecting the machine to the tractor 1 is fixed to the three-point hitch device 48 of the tractor 1. The hitch device 47 is in the form of an L the larger arm 49 of which is disposed perpendicularly to the direction F of travel of the machine. This arm 49 extends beyond the right rear wheel 28 of the tractor 1. The second arm of the hitch device 47 forms an angle approximately equal to 90° with the arm 49 and extends forward in the direction F of travel of the machine approximately to the level of the right rear wheel 28 of the tractor 1. This latter arm (not visible in the accompanying drawings) is engaged in a tube or socket 50 fast with the left lateral wall 20 of the conditioning passage of the mower-conditioner as described above, and thus permits the said machine to pivot, independently of the tractor 1, about an axis 51 directed in the direction F of travel of the machine when hitched to the tractor 1 in the working position.

Without departing from the scope of the present invention, it is quite apparent that the tube or socket 50 constituting the female element of the assembly permitting connection of the machine according to the invention and the tractor could be connected to the arm 49 of the hitch device 47, while the arm constituting the male element of the said assembly would be fast with the mower-conditioner.

When the tractor 1 is moving in the direction F of travel of the machine, the hitch device 47 pushes the machine in the direction indicated by the arrow F because the arm engaged in the tube 50 abuts against the rear extremity of the latter. A bolt 52 articulated on the tube 50 permits of preventing the said arm from disengaging itself from the said tube 50, and permits the tractor 1 to drive the machine in reverse.

The tube or socket 50 is fixed beneath the stiffening arm or post 34 to an angle piece 53 articulated to the left lateral wall 20 of the conditioning passage, by means of a horizontal spindle 54 extending perpendicularly of the direction F of travel of the tractor 1. Thus the tube 50 can pivot about this spindle 54 in a plane parallel to that of the outer face of the wall 20 situated opposite to the right rear wheel 28 of the tractor 1. A compensating spring 55, intended to reduce the pressure which the front of the machine, that is its housing 11, exerts upon the ground, extends between the chasses 2 of the machine and the tube 50. The travel of the tube 50 is limited downwards by virtue of a stop 56 which likewise retains the tube 50 laterally.

In FIG. 3 the bolt 52 is raised and held in place by a spring 57. Thus the bolt 52 abuts against a stop 58, so that the spring 55 does not pull the tube or socket 50 too high, which would be detrimental to the coupling with the hitch device 47 fast with the tractor 1.

Once the coupling is realised, the tube 50 permits the mower-conditioner to oscillate freely in relation to the tractor 1 in a plane perpendicular to its direction F of travel. Thus the machine can follow variations of ground level independently of the said tractor 1.

On changes of direction of the tractor 1 the orientation of the two arms of the hitch device 47, which are connected rigidly to the tractor 1, is likewise modified. The arm constituting the male element of the hitch device 47 and engaged in the tube 50 exerts a force upon the latter in order to oblige the chassis 2 of the machine to follow a path parallel to that of the tractor 1. In order to prevent these forces from deforming the lateral wall 20 of the conditioning passage, which would affect the alignment of the bearings of the conditioning rotor 15, a second stiffening arm or post 59 is fixed parallel to the said left lateral wall 20, is welded thereto and extends in a plane parallel to that of the post 34, and parallel with the tube 50.

The posts 34 and 59 can perfectly well be constituted by one single piece. Moreover in a variant of execution of the invention it is perfectly possible to fix the tube 50 either to the post 59 or to the post 34, or to the post constituted by the assembling of the two parts 34 and 59.

In the foregoing description and according to an important characteristic of the invention, the post or posts 34 and 59, the tube 50 and the wheel 3 closer to the tractor 1 are situated outside the conditioning passage but on the near side of the trajectory 7 of the cutting elements of the cutting mechanism, in the region where the said trajectory is closes to the tractor 1.

The machine is further provided with a safety rail 60 which extends forward and in particular surrounds the discs 4, in order to prevent their blades 5 from being able to approach too close to certain obstacles such for example as trees.

Finally the mower-conditioner according to the invention is equipped with a device for hitching in the transport position, distinct from its device 47 for hitching in the working position. The device for hitching in the transport position comprises two elements 61 and 62, of which one element 61 is mounted approximately in the axis of the tractor 1, behind the hitch device 47. The other element 62 is fixed to the rear of the chassis 2 of the mower-conditioner. When it is desired to transport the machine, it is sufficient to couple the two elements 61 and 62 and to raise the machine by means of the three-point lift device of the tractor 1. The two elements 61 and 62 can advantageously be constituted by the male and female elements of a quick-coupling device.

It is quite obvious that the present invention is not limited to the example of embodiment as described above, to which various modifications, improvements or additions may be made without departing from the scope of the invention.

What is claimed is:

1. A mower-conditioner comprising a cutting mechanism and a conditioning mechanism having a conditioning passage having lateral walls, the said machine being hitched laterally beside a tractor, and comprising a post connected on one end to a double-output control box fixed to one of the lateral walls of the conditioning passage and on the other end to the bearing of an input pulley, and a tube permitting the machine to oscillate about an axis oriented substantially according to the direction of travel of the machine, the said tube constituting its device for hitching in the working position, and the afore-mentioned post extending parallel with the wall of the conditioning passage nearer to the tractor.

2. A mower-conditioner comprising a cutting mechanism and a conditioning mechanism having a conditioning passage having lateral walls, the said machine being hitched laterally beside a tractor, beside one of its rear wheels, and comprising a post connected on one end to a double-output control box fixed to one of the lateral walls of the conditioning passage and on the other end to the bearing of an input pulley, and a tube permitting the machine to oscillate about an axis oriented substantially according to the direction of travel of the machine, the said tube constituting its device for hitching in the working position and the said post extending parallel with the wall of the conditioning passage, outside the said passage but on the near side of the trajectory of the cutting elements of the cutting mechanism, in the region where the said trajectory is closest to the tractor.

3. A mower-conditioner according to claim 1 or 2, wherein the tube is situated beneath the post.

4. A mower-conditioner according to claim 1 or 2, characterised in that the bearing of the input pulley is articulated on the post, the latter being rigidly connected to the double-output control box and connected to the wall of the conditioning passage, while the tube is fixed to the lateral wall of the conditioning passage.

5. A mower-conditioner according to claim 1 or 2, characterised in that the bearing of the input pulley is articulated on the post, the latter being rigidly connected to the double-output control box and connected to the wall of the conditioning passage, while the tube is fixed to the post.

* * * * *